United States Patent
Boesch

[15] 3,691,812
[45] Sept. 19, 1972

[54] STRETCHING MACHINE

[72] Inventor: Albert Boesch, Dusseldorf, Germany

[73] Assignee: Schloemann Aktiengesellschaft, Dusseldorf, Germany

[22] Filed: Feb. 5, 1970

[21] Appl. No.: 8,992

[30] Foreign Application Priority Data

Feb. 11, 1969    Germany..........P 19 06 646.7

[52] U.S. Cl. ................................... 72/308, 72/305
[51] Int. Cl. ..................................... B21d 5/04
[58] Field of Search........ 72/302, 304, 305, 308, 311, 72/293, 295–298; 269/59, 74, 63; 24/263 HW; 188/41

[56] References Cited

UNITED STATES PATENTS

| | | | |
|---|---|---|---|
| 1,873,361 | 8/1932 | Sykes | 72/302 |
| 3,452,574 | 7/1969 | Mackenzie | 72/297 |
| 3,475,943 | 11/1969 | Claussen | 72/297 |
| 3,440,706 | 4/1969 | Ostergren et al. | 72/297 |
| 2,739,634 | 3/1956 | Gray et al. | 72/296 |
| 2,852,062 | 9/1958 | Lorant | 72/302 |
| 1,388,047 | 8/1921 | Jones | 188/41 |
| 1,394,990 | 10/1921 | Foster | 188/41 |

*Primary Examiner*—Charles W. Lanham
*Assistant Examiner*—Michael J. Keenan
*Attorney*—Holman & Stern

[57] ABSTRACT

In a stretching machine for stretching sections, sheet and plate, particularly when made of metal, a clamping head is provided having at least two clamping means operable by pressure operated control means. The clamping head is slidably mounted on rails and is arranged to be clamped thereto by engagement of the clamping means and the rails. Preferably, the clamping means are wedges arranged to engage between a housing of the clamping head and the rails. The problem of the clamping head jamming on the rails during a stretching operation may be avoided.

9 Claims, 2 Drawing Figures

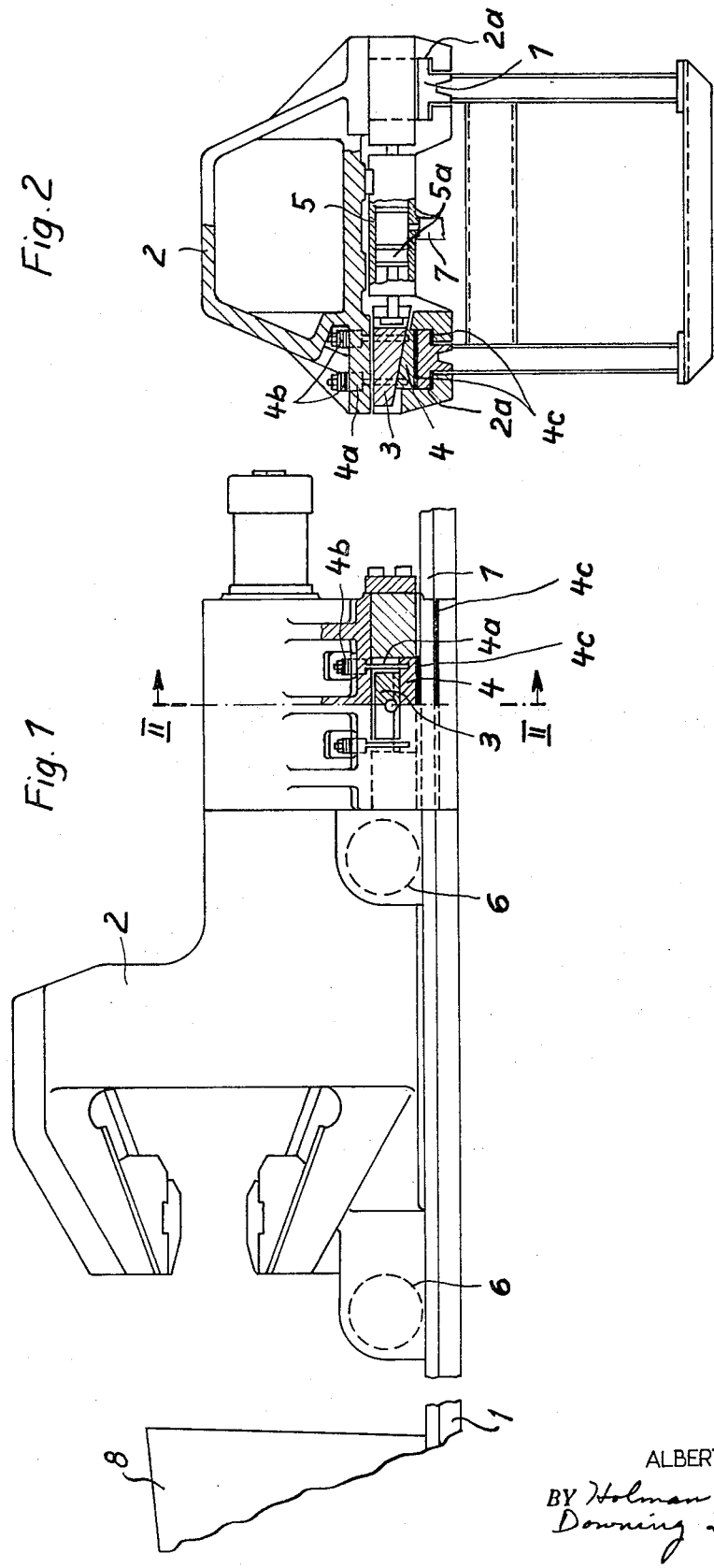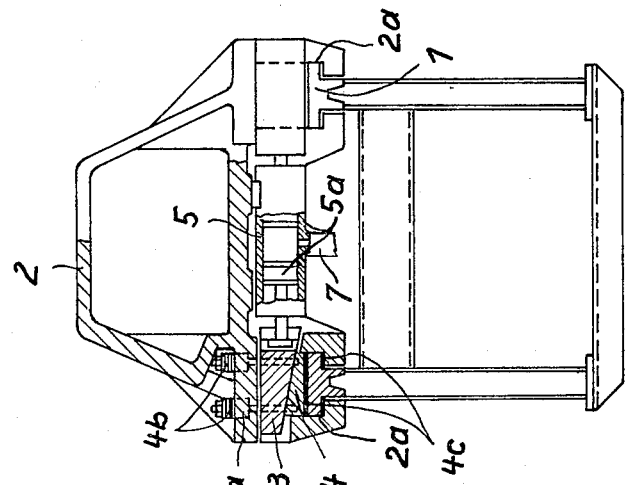

STRETCHING MACHINE

The invention relates to a clamping head for a stretching machine for stretching sections, sheet and plate, particularly of metal, the clamping head being displaceably mounted on rails and arranged to be clamped to the rails during a stretching operation.

In the past, a clamping head has been clamped to each rail by means of separate force-exerting elements, each of these elements bearing on the rails through a friction lining. Each element could move towards the associated rail inside the clamping head, but could not move in the direction of displacement of the clamping head. There is a risk that, due to differences in the operation of the force-exerting elements, which may easily occur, for example, if one of these elements becomes faulty, the clamping head may move askew and become wedged fast on the rails during an operation of stretching.

The invention can provide a stretching machine in which the clamping head is prevented from becoming wedged on the rails during an operation of stretching.

According to the present invention there is provided a clamping head for a stretching machine for stretching sections, sheet and plate, the clamping head being arranged to be displaceably mounted on rails, and to be clamped thereto during stretching, the clamping head comprising at least two clamping means each to be associated with a rail and a pressure operated control means operating the clamping means substantially simultaneously.

In one embodiment the control means includes a piston and cylinder unit, the cylinder being connected to one of the clamping means and the piston being connected via a piston rod to the other clamping means.

During operation or when one clamping means is actuated, the piston-and-cylinder unit is supported on the other clamping means by reaction and vice versa.

In a second embodiment of the invention, the control means includes a cylinder fixedly mounted with respect to the clamping head, and two pistons which are movable relative to one another and arranged in the cylinder, each piston being connected by a piston rod to a respective clamping means.

When one clamping means is operated, one piston is supported on the other clamping means by way of the pressure medium between the pistons and by way of the other piston, and vice versa.

The driving forces exerted on the two clamping means can therefore always be equal. Also, since the capacity of the common piston-and-cylinder unit need not be greater than that of a single force-exerting element in the previous clamping head, this arrangement can obviate the need for more than one force-exerting element and for the energy expended by a further element, for every pair of clamping means.

According to an optional feature of the invention, the clamping-head has a housing which is provided with a device for preventing derailment: the clamping means are wedges displaceable between the clamping-head housing and the rails. Due to the use of these wedges, the adjusting force required for the piston-and-cylinder unit is small in accordance with the angle between the wedge surfaces, so that it is possible to operate either with a low-pressure medium or with a small piston area or small piston-and-cylinder unit.

The invention will be further described, by way of example, with reference to the accompanying drawings, of which:

FIG. 1 shows a clamping head of a stretching machine for stretching sections according to the invention;

FIG. 2 shows the clamping head of FIG. 1 in section along a line II—II.

A clamping head 2 is arranged slidably on two rails 1 or, as indicated by broken lines, to run along these rails on wheels 6. The rails 1 are under cut, being T-shaped in cross-section, are anchored in the bed of the stretching machine and slide in appropriate grooves 2a in the clamping-head housing. The grooves 2a are such that derailment of the clamping-head housing can be prevented; the grooves 2a are made large enough for wedges 3 to be inserted between the rails 1 and clamping-head housing at right-angles to the longitudinal axes of the rails 1. Since the grooves 2a and rails 1 are easier to manufacture if their surfaces of contact with the wedges 3 are all parallel to the plane of displacement of the clamping head 2, the surface of contact of each wedge 3 with the clamping-head housing is made parallel to the plane of displacement of the clamping head 2, and corresponding clamping elements or inserts 4 are provided between the rails 1 and wedges 3. The inserts 4 are movable downwards towards the rails 1 and hence towards the upward-facing surfaces, which form further clamping elements, of the grooves 2a in the clamping-head housing but not in the direction of displacement of the clamping head 2. Furthermore, the surface of contact between each insert 4 and the rails 1 and the surfaces of contact of the clamping-head housing with the rails 1 are provided with friction linings 4c.

During operation, the wedges 3 are adjusted, by way of associated piston rods, by means of a single piston-and-cylinder unit 5, whose cylinder is rigidly attached to the clamping-head housing and which contains two double-acting pistons 5a movable relative to one another. In operation, fluid pressure medium, in this case oil, is introduced by supply means 7 between the pistons 5a so that the wedges 3 are forced outwards between the inserts 4 and the clamping-head housing, with the result that the clamping-head housing is clamped to the rails 1 by the inserts 4 substantially simultaneously to exert substantially equal clamping forces. Stretching of the sections in the stretching machine can then take place.

After stretching, pressure is applied to those faces of the pistons 5a closer to the associated wedges 3, whereas those faces of the pistons which are remote from the wedges 3, and to which the pressure was previously applied, are relieved of pressure so that the wedges 3 move back and the clamping head is no longer clamped. The clamping head 2 can now move freely again on the rails 1.

To prevent the friction linings 4c from rubbing on the rails and therefore becoming worn during movement of the clamping head 2, some clearance is provided between the rails 1 and those surfaces of the clamping-head housing which bear friction linings during this movement. The inserts 4 are lifted by cup springs 4b (by way of tie-rods 4a) immediately after the clamping action ceases.

In another embodiment of the invention, the build-up of pressure in the piston-and-cylinder unit 5 for clamping the clamping head 2 depends on the stretching power exerted by stretching means 8 of the stretching machine. In hydraulically operated stretching machines, for example, this may be done by providing the corresponding piston-and-cylinder units in the machine and the piston-and-cylinder unit 5 with a common pressure line fed by common supply means 7.

I claim:

1. An improved clamping head for a stretching machine for stretching sections, sheet and plate, wherein the clamping head is displaceably mounted on spaced parallel rails and has at least two clamping means each associated with a respective rail for clamping the clamping head to the rails for a stretching operation, the improvement comprising: a pressure operated control means actuated by a single fluid for operating said clamping means substantially simultaneously to exert substantially equal clamping forces of each said rail, wherein the clamping means comprises a wedge displaceably mounted so as to be engageable between the clamping head and the rails, whereby the clamping head can be clamped thereto.

2. An improved clamping head for a stretching machine for stretching sections as claimed in claim 1, wherein the corresponding rail has a top portion having a taper complementary to that of the wedge which is to engage therewith.

3. An improved clamping head for a stretching machine for stretching sections, sheet and plate, wherein the clamping head is displaceably mounted on spaced parallel rails and has at least two clamping means each associated with a respective rail for clamping the clamping head to the rails for a stretching operation, the improvement comprising a pressure operated control means actuated by a single fluid for operating said clamping means substantially simultaneously to exert substantially equal clamping forces of each said rail, the improvement further comprising: a pressure fluid supply means for supplying pressure fluid to operate stretching means of the stretching machine and to operate the control means, whereby the clamping pressure controlled by the control means is proportional to the stretching force exerted.

4. An improved clamping head for a stretching machine as claimed in claim 1, wherein the control means comprises a cylinder rigidly mounted with respect to the clamping head, two pistons arranged in the cylinder, and a piston rod extending from each piston out of the cylinder to a respective wedge.

5. An improved clamping head for a stretching machine as claimed in claim 4, wherein the two piston rods are in colinear relation and in direct opposition to each other.

6. A clamping head for a stretching machine for stretching sections, sheet and plate, wherein the clamping head is displacably mounted on spaced parallel rails, the clamping head comprising at least two clamping means each associated with a respective rail for clamping the head to the rails during a stretching operation, each of said clamping means having two clamping elements for laterally engaging opposite sides of the rails, a fluid motor operationally disposed beneath said housing, said fluid motor including opposed, simultaneously operable, piston-and-rod assemblies operatively connected to said clamping means, said clamping elements incorporating means affording a mechanical advantage in conjunction with said piston-and-rod assemblies in relation to the size of said pistons; and fluid supply means operatively connected to said fluid motor, whereby the clamping head is clamped to each of said rails between said clamping elements substantially simultaenously and with substantially equal clamping forces.

7. A clamping head as claimed in claim 6 in which said fluid motor is secured to said clamping head.

8. A clamping head as claimed in claim 6 in which said clamping head comprises mounting means having a shape corresponding to that of said rails, said rails having an undercut portion to which said corresponding portion confirms for preventing de-railment of said mounting means whereby said clamping head can only be removed from said rails by displacement thereof in the direction toward which said rails extend.

9. A clamping head as claimed in claim 6 in which said clamping head includes means for normally biasing said clamping means elements out of engagement with said rails in the absence of outward forces exerted by said fluid motor on said piston-and-rod assemblies.

* * * * *